Inventors
Alden Edrick Favro
Richard Thomas Warburton
Nicholas Dominic Commisso

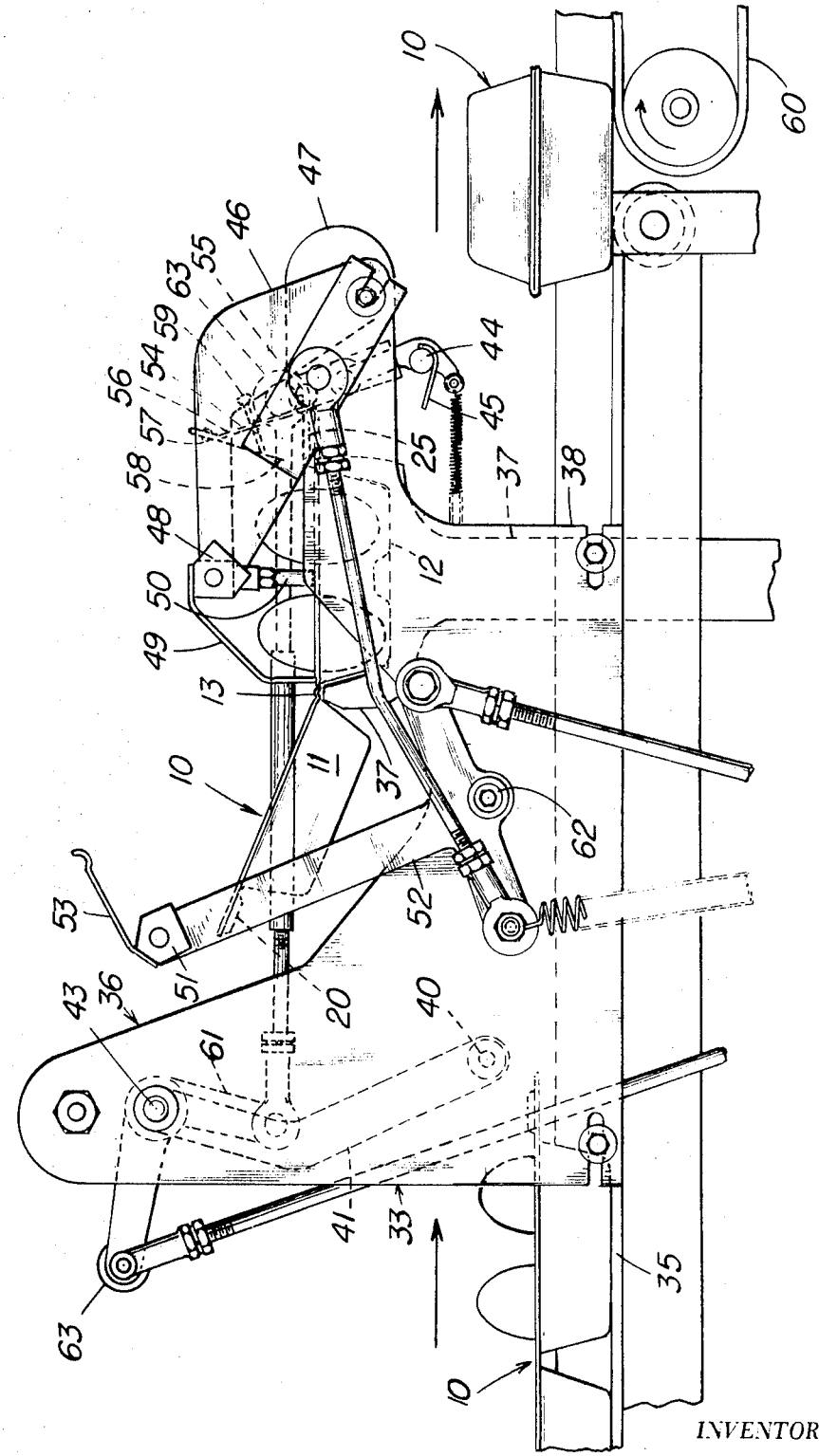

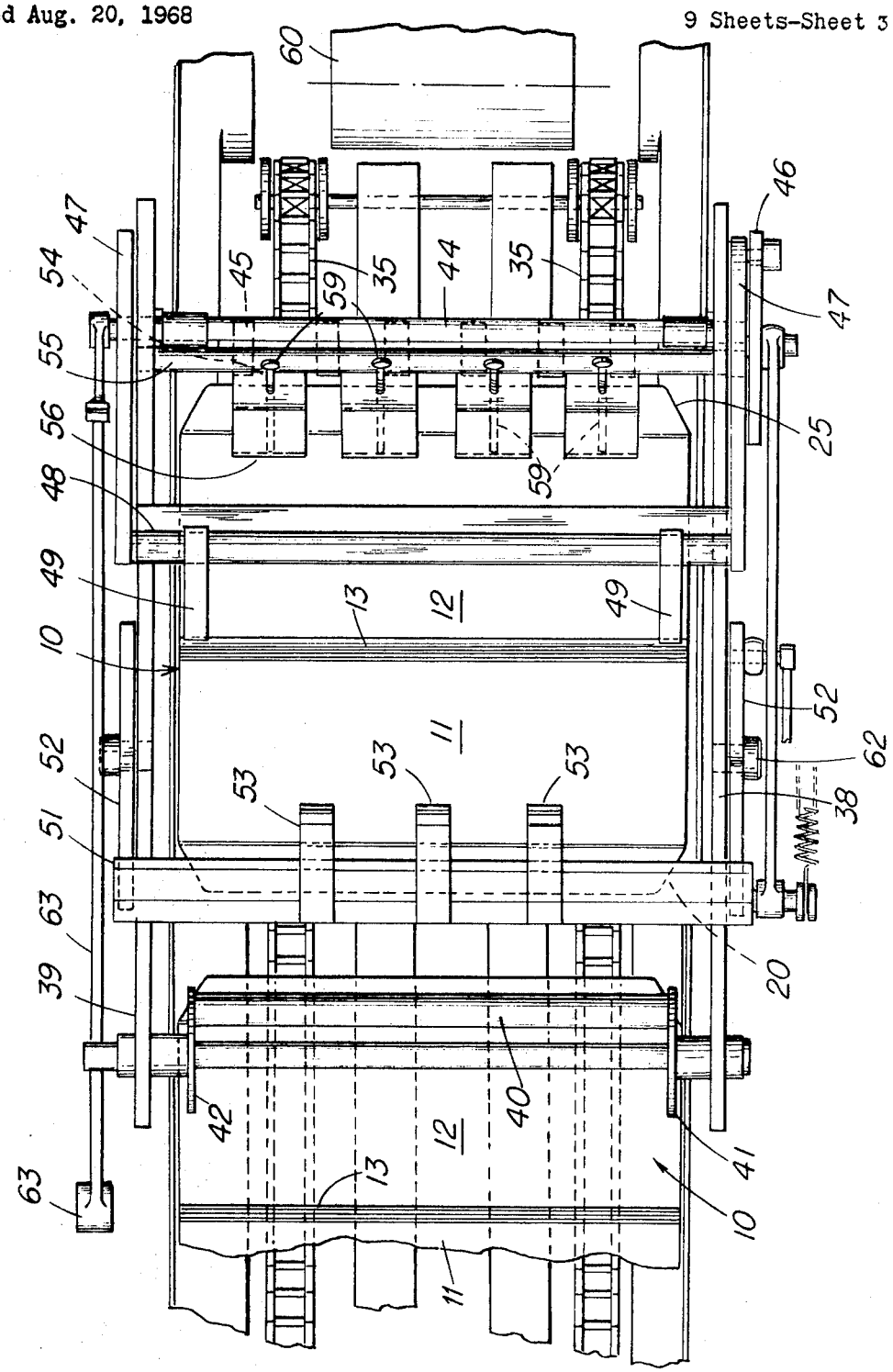

July 7, 1970   A. E. FAVRO ET AL   3,518,811
EGG CARTON CLOSING APPARATUS
Filed Aug. 20, 1968   9 Sheets-Sheet 4
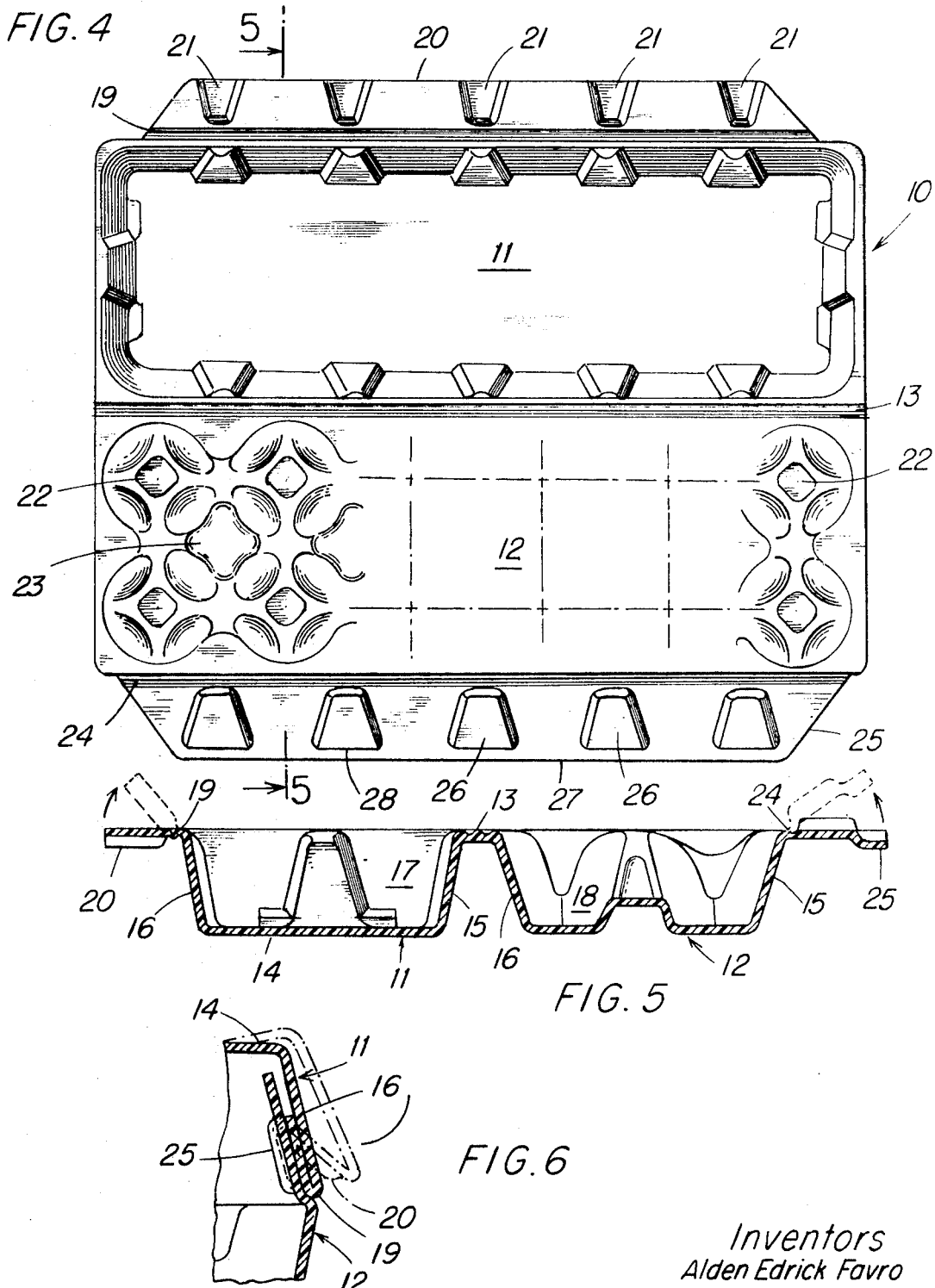
Inventors
Alden Edrick Favro
Richard Thomas Warburton
Nicholas Dominic Commisso Inventors
Alden Edrick Favro
Richard Thomas Warburton
Nicholas Dominic Commisso Inventors
Alden Edrick Favro
Richard Thomas Warburton
Nicholas Dominic Commisso July 7, 1970 — A. E. FAVRO ET AL. — 3,518,811
EGG CARTON CLOSING APPARATUS
Filed Aug. 20, 1968 — 9 Sheets-Sheet 8

Inventors
Alden Edrick Favro
Richard Thomas Warburton
Nicholas Dominic Commisso

July 7, 1970

A. E. FAVRO ET AL.

3,518,811

EGG CARTON CLOSING APPARATUS

Filed Aug. 20, 1968

Inventors
Alden Edrick Favro
Richard Thomas Warburton
Nicholas Dominic Commisso 3,518,811
EGG CARTON CLOSING APPARATUS
Alden E. Favro, Holcomb, Richard T. Warburton, Canandaigua, and Nicholas D. Commisso, Victor, N.Y., assignors to Mobil Oil Corporation, a corporation of New York
Filed Aug. 20, 1968, Ser. No. 753,980
Int. Cl. B65b 7/26
U.S. Cl. 53—376                    15 Claims

ABSTRACT OF THE DISCLOSURE

An apparatus for closing and locking egg-filled cartons. The apparatus includes a plurality of cooperative carton closing components adapted to elevate an individual egg carton above a travel path and then impart incremental closing motion to the carton cover and carton cover locking flange and bottom locking flange. This will provide for the continuous closing and locking of egg cartons in a rapid and effective manner.

---

This invention relates to an egg carton closing apparatus and, more particularly, to a unique and improved high-speed carton closing device adapted to rapidly close and lock egg-filled cartons.

The rapidly increasing demands of the retail food industry for pre-packaged and cartoned eggs has generated a definite need for reliable, high-speed closing devices and apparatuses which are adapted to close and lock the popular pocketed or cellular egg-filled cartons. In general, the egg carton closing arrangements presently available and in use, are designed to primarily close egg cartons formed essentially of a molded pulp unitary structure consisting of a dished carton cover with front and rear wall portions, and a bottom cellular egg-receiving portion hinged to the lower edge of the cover rear wall portion. The cartons also include locking flap structure hinged to the front edge of the carton bottom portion and adapted to engage in an interlocking manner with cooperative or complementary carton locking structure formed integrally with the interior of the carton cover front wall portion when the cartons are closed by the closing arrangements and apparatuses.

Although prior art egg carton closing machines and apparatuses are generally satisfactory when employed in closing molded pulp or cardboard egg cartons of the type described above, they are restricted in their applications and versatility, and are usually not readily adapted for use in connection with differently shaped cartons and inherent carton closing structures. Thus, for example, the presently available egg carton closing apparatuses are not quite suitable for the exacting closing standards and specifications required for devices used in closing egg cartons manufactured from thermoplastic materials such as foam polystyrene, polyethylene, polypropylene and polyvinyl chloride, among others. Another drawback of presently available egg carton closing arrangements is that the closing devices cannot be readily used in closing and locking egg cartons having different types of locking flap or flange configurations.

A highly desirable and advantageous type of egg carton design which has been recently developed and accepted in the retail industry with a marked degree of commercial success, comprises a dished carton cover section which is integrally formed with an hinged to an egg-receiving cellular bottom section. In general, although not limited thereto, the number of cells or pockets in the bottom section constitutes a dozen cells arranged in two parallel rows, each of which includes six egg-receiving cells or pockets. The egg cartons each include a carton locking arrangement consisting of a bottom locking flange which is formed integral with and hinged to the edge of the cellular bottom section of the egg carton and with the flange being adapted to telescope slidingly upwardly into locking engagement with a locking flange provided in the cover section of the egg carton, as the cover section is brought down toward the bottom section of the carton so as to effect closing thereof. The carton cover section locking flange is generally formed integrally with and hinged to the side wall edge or margin of the carton cover section, and includes recesses or detents adapted to cooperate with complementary projections or protuberances on the bottom section locking flange, to thereby provide interlocking engagement so as to lock the egg cartons when the latter are in a closed condition.

As may be quite readily ascertained, the egg carton closing arrangements and apparatuses presently available are not suitable for nor adapted to the closing and locking of egg-filled cartons which incorporate this novel and advantageous carton cover and bottom section locking flange construction. Moreover, the prior art egg carton closing apparatuses, which are primarily designed for the closing of egg cartons having only bottom locking flange structures, are not capable of being readily converted to accommodate this type of egg carton.

In essence, the present invention satisfies the needs and requirements of the industry, while concurrently obviating and eliminating the disadvantages and inherent limitations of prior art egg carton closing arrangements and apparatuses, by providing a high-speed, compact and efficient egg carton closing apparatus adapted to close and lock egg cartons of various types of construction and material. The present novel egg carton closing apparatus is designed to, in effect, accurately guide and close egg cartons which incorporate cooperatively interengaging carton cover and bottom section locking flanges. An additional feature of the inventive egg carton closing apparatus disclosed herein, is that it may be incorporated in the egg packaging production line of existing plant facilities so as to form a so-called "in-line" closing device which largely eliminates the need for extensive equipment modifications. Further, the present egg carton closing apparatus may also be employed in closing egg cartons of the prior art types, without the necessity for extensive modifications of the apparatus.

Another significant aspect of the egg carton closing apparatus, according to the present invention, lies in the construction of a unique closing device employing a plurality of carton closing elements in synchronous and coordinated successive motions adapted to impart a predetermined carton closing sequence to the various carton cover and locking flange components. The gradual, incremental and coordinated carton closing sequence inherent in the inventive carton closing device, will assure the accurate and rapid closing of egg-filled cartons in a precise and effective manner.

Preferably, the egg carton closing apparatus, as contemplated by the present invention, comprises a conveyor system adapted to sequentially move open egg cartons, which have been previously filled with eggs in a manner well known in the art, along a generally horizontal travel path, toward a carton closing station or device. As the individual egg cartons reach the closing device, they are raised a predetermined distance above the travel path by support elements which form a part of the conveyor system. During this period, while the carton in the closing device station is elevated, a plurality of coordinated carton closing elements of the device, impart incremental closing motion to the carton cover section. Concurrently, these and other carton closing elements impart motion to the carton cover and bottom locking flanges so as to position these in carton locking interengagement whereby the carton is locked during the final incremental closing motion of the carton cover. The closed and locked egg cartons are then lowered by the conveyor system support elements toward the carton travel path and conveyed toward a further processing or shipping station. The high-speed carton closing operation of the present apparatus, in effect, will facilitate the rapid and efficient packing and shipping of various types of egg cartons used in the retail trade.

Accordingly, it is a primary object of the present invention to provide an improved and novel apparatus for efficiently closing and locking various types of egg-filled cartons.

Another object of the present invention is to provide an apparatus for the high-speed closing of egg-filled cartons which are being sequentially conveyed toward an egg carton closing device.

A further object of the present invention is to provide an apparatus for closing and locking egg cartons being sequentially conveyed along a travel path, including means adapted to raise the cartons toward a closing device at a point of carton travel whereby the latter may close the cartons in a predetermined carton closing and locking sequence.

A more particular object of the present invention is to provide a novel egg carton closing device as described herein, including conveyor means adapted to position open egg-filled cartons in successive order in the closing device whereby a plurality of coordinated carton closing elements of the device may impart incremental closing motion to the carton cover and locking flange components so as to lock the carton in an effective, high-speed sequence.

The invention herein will be clearly understood by consideration of the following description thereof, reference being made to the appended drawings, wherein:

FIG. 2 is a side elevational view of the carton closing apparatus according to the present invention;

FIG. 3 is a top plan view of the apparatus of FIG. 2, with portions removed for purposes of clarity;

FIG. 4 is a top plan view of an egg carton in an open position;

FIG. 5 is a sectional view along line 5—5 in FIG. 4;

FIG. 6 is an enlarged fragmentary sectional view of the latching mechanism of the egg carton of FIG. 4;

Figure 1:
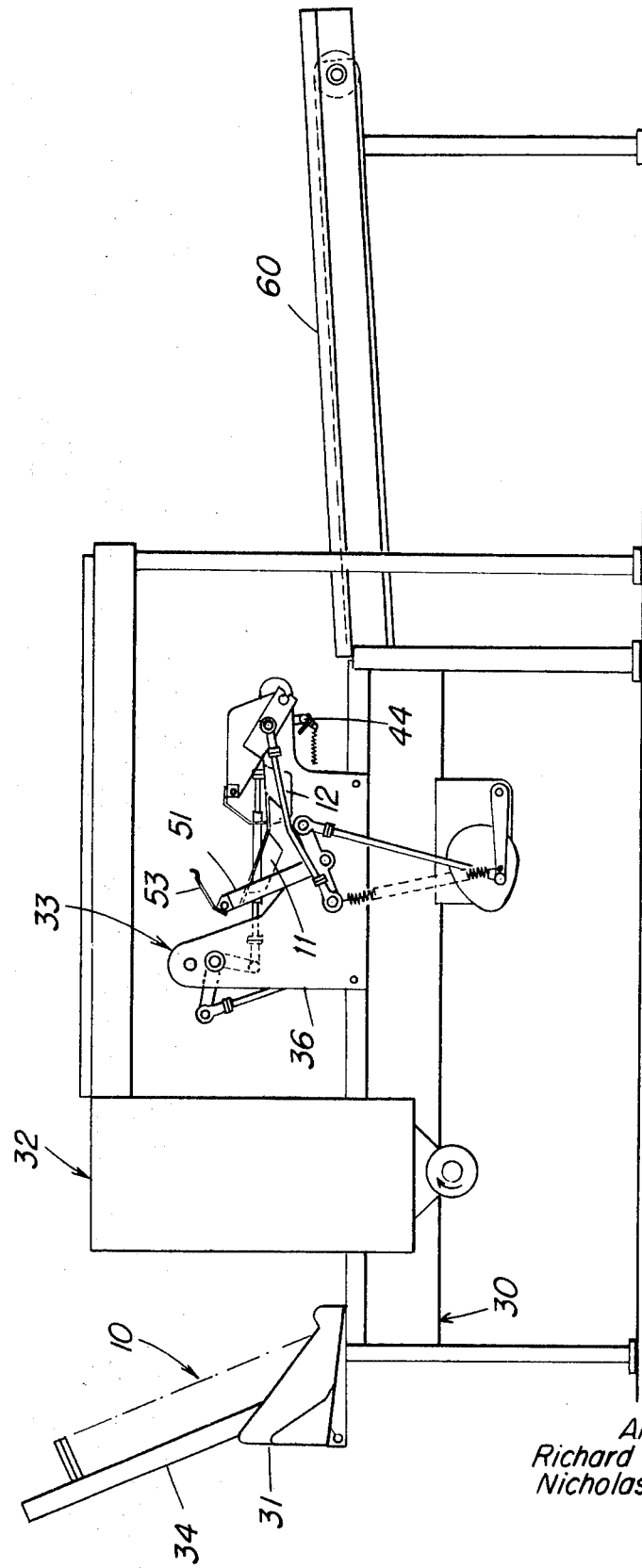
FIG. 1 is a side elevational view, partially in schematic, illustrating an egg packaging installation incorporating the egg carton closing apparatus according to the present invention.

In order to obtain a clear understanding of the egg carton closing device according to this invention, a detailed description of a typical egg carton construction is desirable.

Referring now specifically to the drawings, and in particular to FIGS. 4 to 6, a preferred form of egg carton, generally designated as 10, and adapted to be closed by the present carton closing apparatus, is now herein described. The carton 10 may be basically the type of commercially available 2 x 6 egg carton extensively used and sold in food retail establishments.

Essentially, the carton 10 consists of a cover section 11 and a bottom cellular section 12 integrally connected thereto along a common longitudinal margin by an integral hinge member 13. The cover section 11 includes a generally planar, rectangular top surface portion 14 and four wall members formed integrally therewith. The wall members comprise side walls 15 and 16 respectively, and a pair of end walls 17 and 18. As illustrated more clearly in FIGS. 4 through 6, the walls 15, 16, 17 and 18 depend downwardly from top surface portion 14 and flare outwardly at a slight angle to the vertical. The lower longitudinal edge of side wall 15 extends into and is integrally connected with hinge member 13 which secures cover section 11 and bottom cellular section 12 in hinged relationship. A hinge 19 connects the lower longitudinal margin or edge of side wall 16 with a cover section locking flange 20, the latter of which is molded integrally with the lower front edge of cover section wall 16 along hinge 19. As shown in FIG. 4, cover section locking flange 20 may be integrally molded in flat position extending outwardly substantially perpendicular to cover section 11. The locking flange 20 is adapted to be rotated inwardly of the cover section 11 to a position adjacent to and generally parallel with the inner surface of side wall 16 when the carton sections 11 and 12 are in closed relationship. The surface of locking flange 20 is provided with a plurality of wedge shaped projections 21 disposed at locations intermediate pairs of adjacent cells in the bottom section 12 when the carton 10 is in a closed position.

The cellular bottom section 12 of the carton 10 is constituted of a series of egg-receiving pockets or cells 22 arranged in two parallel rows of six cells each, and divided by upstanding hollow, substantially pyramidal shaped post members 23. As shown in FIGS. 4 and 5, integrally hinged at edge 24 along the longitudinal length of the cellular bottom section 12, and opposite hinge 13, is a bottom section locking flange 25 which extends along substantially the entire length of bottom cellular section 12. Locking flange 25 may be integrally molded in a flat position extending outwardly, and substantially perpendicular to bottom section 12, and is adapted to be rotated about hinge edge 24 to a substantially vertical position, so as to be located interiorly of the front side wall 16 when the carton sections 11 and 12 are in closed relationship.

A plurality of longitudinally spaced wedge shaped detents or recesses 26 are provided on the surface of bottom locking flange 25, and disposed at locations intermediate adjacent egg-receiving cells 22 contained in bottom section 12. The wedge shaped recesses 26 conform in shape and are generally complementary to the wedge shaped projections 21 provided on the surface of cover locking flange 20, and are adapted to receive the projections 21 in interlocking, mating engagement when the carton 10 is in a closed relationship. As shown, the base portions of wedge shaped recesses 26 are located somewhat below the leading edge 27 of bottom locking flange 25 whereby a series of locking detents 28 are provided along the upper portion of locking flange 25.

In order to effect locking closure of the carton 10, bottom locking flange 25 is rotated about hinge 24 from its normal horizontal position to an upstanding or vertical position as illustrated by the dotted lines in FIG. 5. Subsequently cover section 11 is rotated about hinge 13 toward closing relationship with bottom cellular section 12. Simultaneously, cover locking flange 20 is rotated about its integral hinge 19 to a position adjacent to the inner surface cover section side wall 16.

In describing the construction and operation of the egg carton closing apparatus according to this invention, reference may be had hereinbelow to the above described features and elements of the egg carton 10.

A typical egg packaging installation, as illustrated in FIG. 1 of the drawings, comprises a basic stationary main frame 30 which supports an egg carton stacking and separating assembly 31, an egg handling and carton loading unit 32, and a carton closing apparatus 33. The carton stacking and separating assembly 31 may comprise an inclined chute 34 adapted to support a stack of nested, open egg cartons 10. Suitable separating means (not shown) remove individual cartons from the bottom of the stack and a conveyor forwards the cartons toward the carton loading unit 32. At the carton loading unit, each of the carton bottom cellular sections 12 is filled with eggs. Inasmuch as the carton separating assembly 31 and the loading unit 32 do not form a part of the carton closing apparatus according to the present invention, no further detailed description thereof is deemed necessary for the purposes of this disclosure.

Referring now in detail to the egg carton closing apparatus 33, as illustrated in FIGS. 2 and 3 of the accompanying drawings, a plurality of spaced conveyors 35 position the filled egg cartons 10 at the carton closing device 36. The conveyors 35 include carton supporting cradles 37 which are adapted to support and grasp the bottom cellular sections 12, and lift the cartons 10 a predetermined vertical distance above the carton travel path provided along conveyors 35.

In essence, the carton closing device 36 includes a pair of spaced upright stationary support walls 38 and 39, which are positioned on opposite sides of the installation main frame 30. The cartons 10 are raised between the support walls 38 and 39 by the cradles 37. When the filled egg carton 10 is at its uppermost vertical position, as shown in FIG. 2 of the drawings, a cover closing bar 40 is adapted to impart initial closing motion to the carton cover section 11. The carton cover closing bar 40 extends along the carton cover between walls 38 and 39, and is attached between a pair of lever arms 41 and 42 which are pivotally fastened at their upper ends to a rod 43. Rod 43 extends between and is rotatably journalled in support walls 38 and 39.

As the carton cover closing bar 40 imparts initial closing motion to the carton cover section 11, a bottom locking flange closing or tucker bar 44 imparts closing or upward rotating motion to the bottom locking flange 25 and maintains the flange 25 in that position by means of a plurality of spaced tucking plates 45 positioned along the length of tucker bar 44. The tucker bar 44 is rotatably mounted on and between a pair of pivotable brackets 46, the latter of which are positioned on extensions 47 of walls 38 and 39. Interconnected linkage means, to be described in greater detail hereinbelow, correlate the motion of the cover closing bar 40 with the actuation of the bottom locking flange tucker bar 44.

In order to assure that the cartons 10 are maintained on the cradles 37, a carton hold-down bar 48 is mounted on and extends between brackets 46. The hold-down bar 48 includes a pair of bent fingers 49 which are adapted to engage the bottom cellular section 12 of carton 10 adjacent to hinge member 13 when the carton 10 is in the raised position in carton closing device 36. Vent fingers 49 function to hold the carton cover in position until fingers 53 have folded flaps 20. One or more depending rods 50 may also extend from bar 48 into engagement with the tops of post members 23 intermediate adjacent egg-receiving cells of carton bottom section 12.

When the carton cover section 11 is in the raised or initial closed position, under the urging of cover closing bar 40, a carton cover locking flange closing member 51 places the cover locking flange 20 into carton closing condition. In order to obtain this effect, the closing member 51, which comprises a bar mounted between a pair of oscillatable linkage members 52 located externally of each of walls 38 and 39, includes a plurality of spaced, parallel projections or fingers 53 which are adapted to contact the carton cover locking flange 20. As the fingers 53 contact the flange 20, the closing member 51 contacts the surface of carton cover section 11 an takes over the continued carton cover closing function from cover closing bar 40.

A carton cover locking flange camming member 54 comprises a rod 55 mounted on and extending between brackets 46. A pluarilty of spaced plate members 56 are fastened to rod 55 and project upwardly therefrom. Each of plate members 56 has attached thereto by suitable screw means 57 a resilient, depending sheet metal plate 58 which is adapted to contact the carton cover locking flange and bias it inwardly of the cover section depending wall. In order to provide adjustment of the resilient plates 58, each plate member 56 has an adjusting screw 59 extending therethrough in engagement with the surface of plate 58. The camming action of the resilient plates 58 on cover locking flange 20 will assure the inward rotation of the flange 20 within cover section 11 and provide interlocking engagement with the carton bottom locking flange 25 as the cover closing member 51 completes the closing of the carton cover.

After closing of the carton cover 11 by the closing device 36, the cradles 37 retract and lower the closed egg carton 10 toward the travel path defined by the conveyors 35. The conveyors then move the closed egg carton 10 toward a receiving conveyor 60, which in turn moves the carton to a further processing or shipping station.

As shown in FIG. 2 of the drawings, the various carton closing components of the closing device 36, such as the cover closing bar 40, bottom locking flange closing or tucker bar 44, cover closing member 51, locking flange camming member 54, and hold-down bar 48 are interconnected by a suitable linking arrangement which is driven or actuated by suitable motive power means (not shown). The linking arrangement, to be discussed hereinbelow, contemplates the simultaneous or sequential actuation of the carton closing device components in order to provide the rapid and efficient closing of a continuous supply of filled egg cartons being furnished to the carton closing device 36.

In order to obtain a more complete understanding of the invention, the operation of the present carton closing apparatus as applied to a single egg carton 10 is now described, while having reference to FIGS. 7 to 11 of the drawings.

Figure 7:
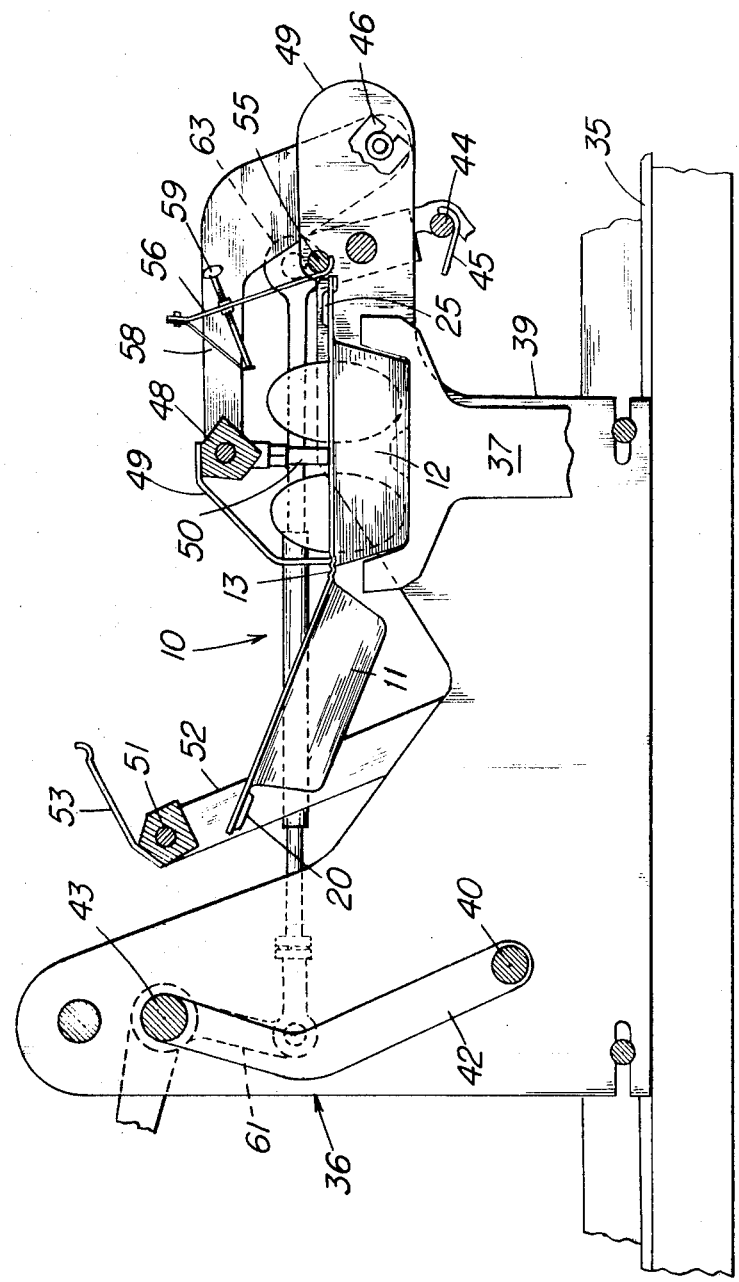
FIG. 7 is a side elevational sectional view of the egg carton closing apparatus of FIG. 2 with a carton positioned in the apparatus and illustrating a first stage of the carton closing operation.

In FIG. 7, an open egg-filled carton 10 has been conveyed by conveyors 35 toward the carton closing device 36, with the edge of the carton bottom locking flange 20 as its leading edge, and elevated to its maximum height above conveyors 35 by cradles 37. The T-shaped linkage lever 52 (illustrated in FIG. 2) is pivoted about pivot point 62 to its maximum counter-clockwise position. This, in effect, will hold the cover closing member 51 in a retracted position, and maintain the hold-down bar 48 in contact with the carton bottom section 12. At this time, a linkage member 63 is actuated so as to impart counter-clockwise movement to lever arms 41 and 42 about rod 43. This will move the cover closing bar 40 into contact with the carton cover section 11 and cause the latter to be raised into initial carton closing sequence about hinge member 13.

Figure 8:
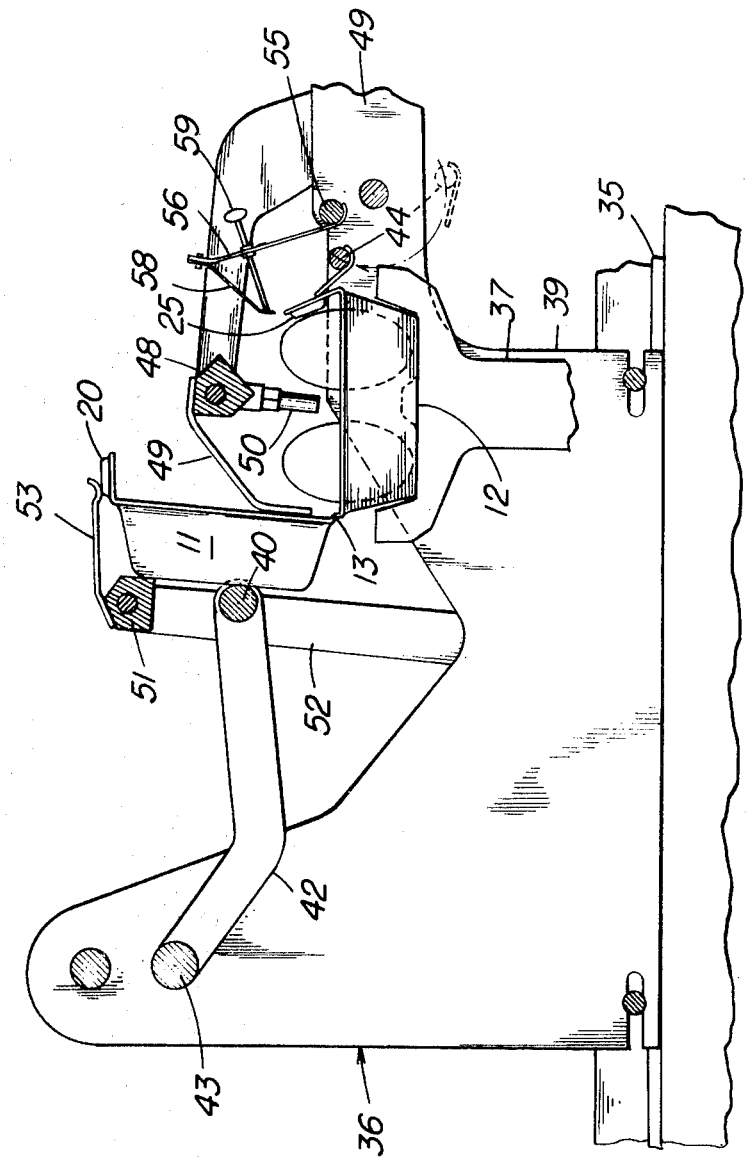
FIG. 8 is a side elevational sectional view of the egg carton closing apparatus of FIG. 2 with a carton positioned in the apparatus and illustrating a second stage of the carton closing operation.

In FIG. 8, the cover bar 40 has rotated the egg carton cover section 11 approximately 90° to a half-closed position. Simultaneously, the bottom locking flange tucker or closing bar 44, through suitable linkage means connected to linkage lever 52, has rotated carton bottom locking flange 20 up into carton closing condition. An arm member 61 is fastened to rod 43 externally of support wall 39 of the carton closing apparatus 33 so as to be rotatable in conjunction with the motion of lever arm 41. A linkage rod 62 is adapted to connect the free end of arm member 61 with an extension or arm 63, which can also be a lost motion or bell crank, which is pivotably mounted about pivot point or rod 55 on bracket 46. Accordingly, as the carton cover closing bar 40 rotates upwardly into cover closing position, the carton bottom locking flange tucker bar 44 is pivoted toward the carton so as to enable fingers 45 to rotate and maintain the bottom locking flange 25 in carton closing condition. Although, not described in detail, it will be apparent to one skilled in the art that numerous mechanical linkage arrangements may be employed to attain this operational carton closing sequence. The projecting fingers 53 on carton cover flange closing member 51 now commence to impart a folding, closing motion to carton cover locking flange 25. Concurrently, the hold-down bar 48 commences retraction from the carton bottom section 12, since the hold-down bar 48 and closing member 51 are connected whereby advancing motion of the latter is adapted to retract the former.

Figure 9:
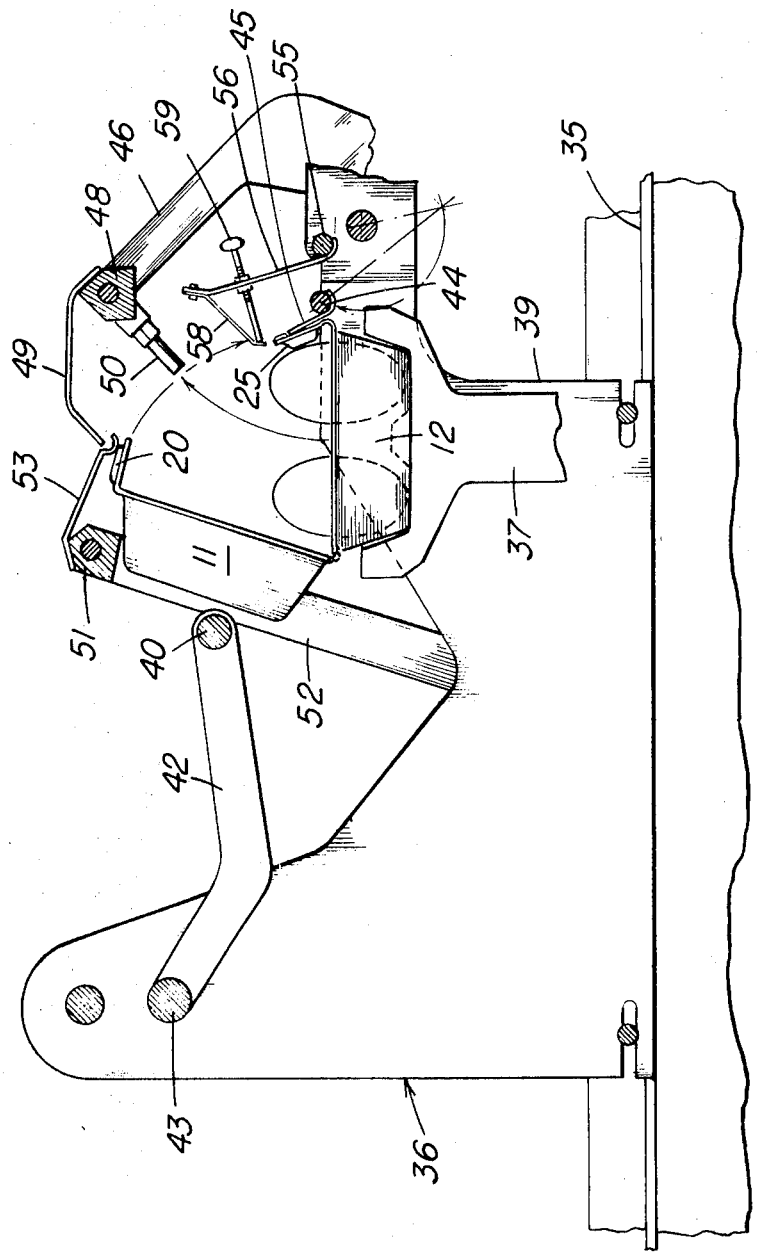
FIG. 9 is a side elevational sectional view of the egg carton closing apparatus of FIG. 2 with a carton positioned in the apparatus and illustrating a third stage of the carton closing operation.

In FIG. 9, the fingers 53 continue closing the carton cover locking flange 25, while the hold-down bar 48 retracts still further away from the carton bottom section 12. The carton cover closing bar 40 is no longer in contact with the carton cover section 11, and continued cover closing is now effected by closing member 51 and fingers 53.

Figure 10:
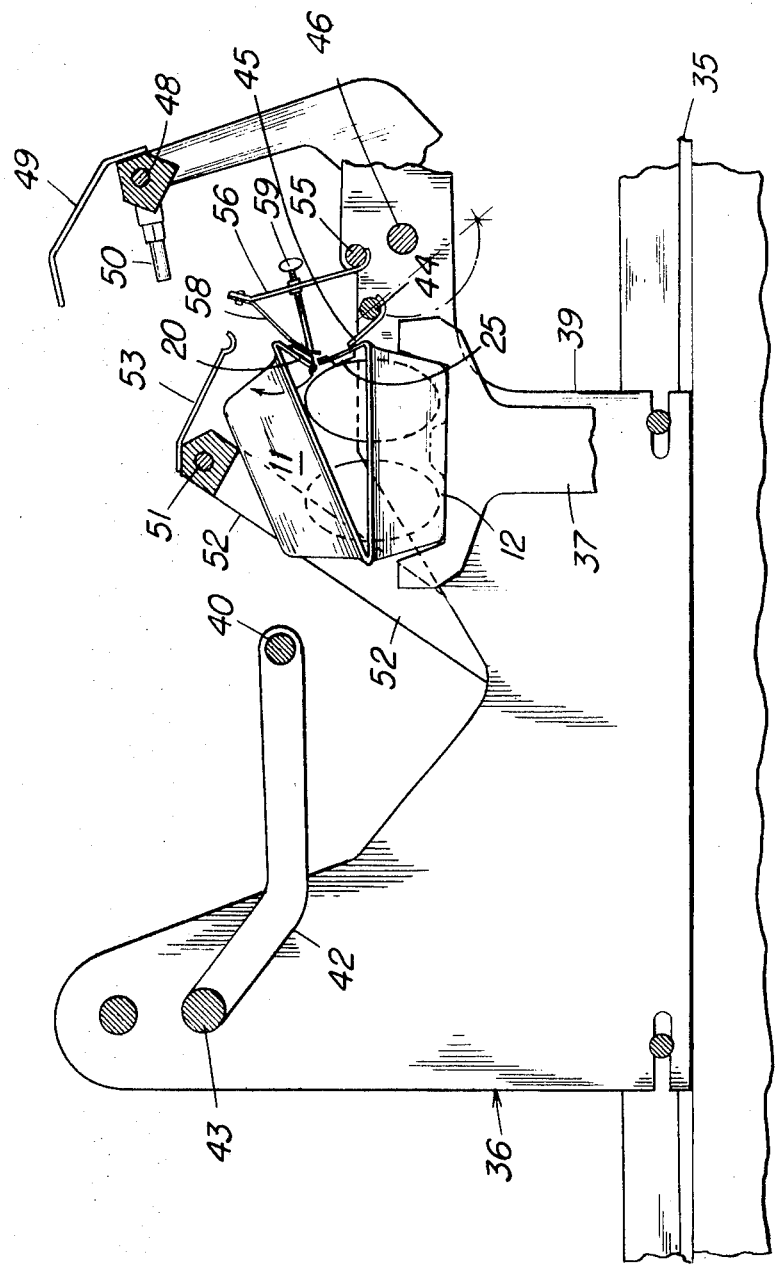
FIG. 10 is a side elevational sectional view of the egg carton closing apparatus of FIG. 2 with a carton positioned in the apparatus and illustrating a fourth stage of the carton closing operation.

In FIG. 10, the carton cover locking flange 25 is cammed inwardly of the carton cover 11 by the camming or biasing action of resilient plates 58. This will cause the fingers 53 to lose contact with the cover locking flange and thus become inoperative. The continuous closing of the carton cover section is now effected solely by the closing member 51 in engagement with the carton cover surface. Hold-down bar 48 has been and is being retracted still further, while the bottom locking flange tucker or closing bar 44 maintains the bottom locking flange 20 in carton locking position.

Figure 11:
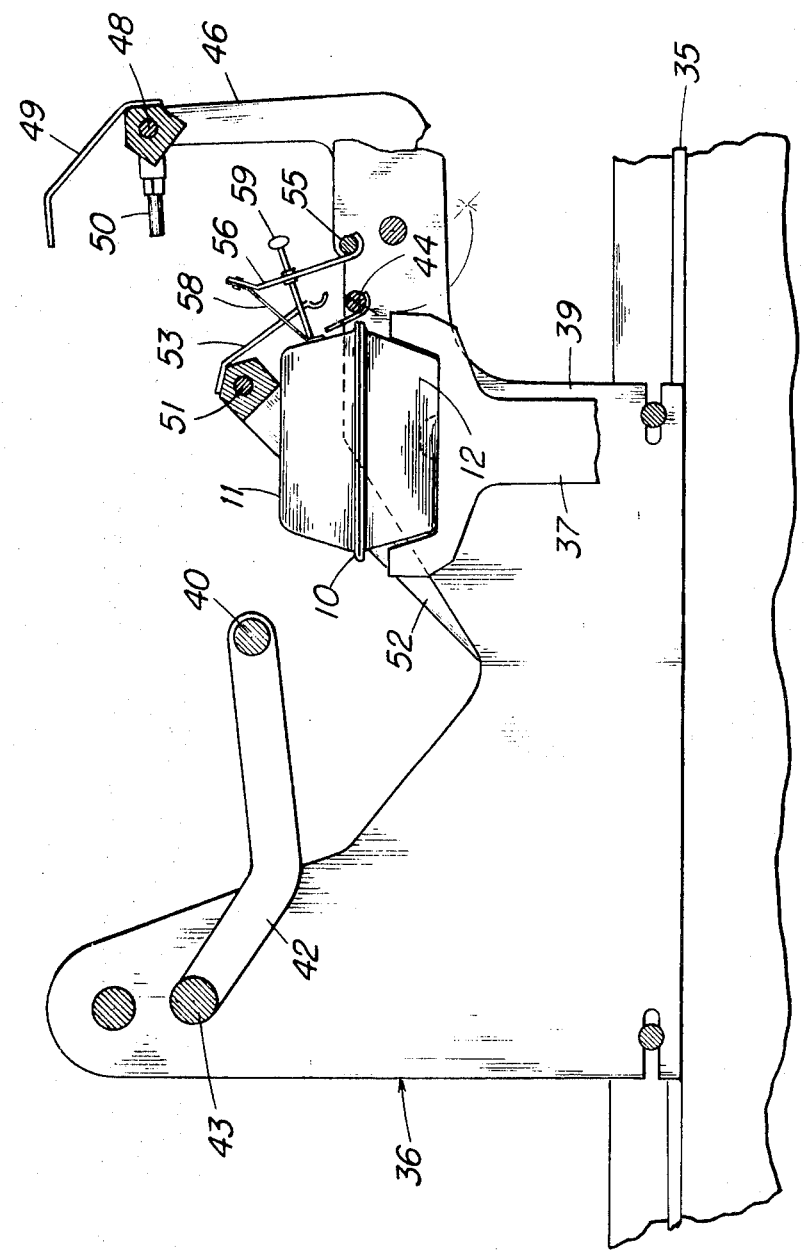
FIG. 11 is a side elevational sectional view of the egg carton closing apparatus of FIG. 2 with a carton positioned in the apparatus and illustrating the final stage of the carton closing operation.

As illustrated in FIG. 11, closing bar 44 has been retracted and resilient plates 58 have been displaced by the cover in order to enable the cover closing member 51 to impart the final closing incremental motion to carton cover section 11. This causes the cover locking flange 25 to rotate upwardly within the cover section 11, as shown in FIG. 6, and to overlie bottom locking flange 20 in carton locking engagement. The cradles 37 now lower the closed and locked egg carton 10 down toward the conveyor line 35 and transport the carton toward conveyor belt 60. At this time, the various carton locking device components move back into the positions shown in FIGS. 2 and 7 in order to be able to receive a successive open egg carton 10 for closing and loading operations.

An important aspect and advantage of the present egg carton locking device is that it may be readily employed with prior art molded pulp cartons having only bottom section locking flanges or flaps which are adapted to cooperate with recesses or detents in the cover wall. In this instance, the resilient plates 58 may be retracted out of the way of the carton covers by either manipulating the adjusting screws 59, or by removing the resilient plates 58 altogether.

Although the apparatus is shown to include four resilient plates 58 for biasing or camming the cover locking flanges 25, and three fingers 53 passing between the plates 58, it will be readily apparent that any other plurality or amount may be employed as desired by the particular carton closing arrangement.

Having described the invention in detail, it will be apparent that various modifications will occur to those skilled in the art, such changes being within the spirit and scope of the invention which is limited only as defined in the claims following.

What is claimed is:

1. An apparatus for closing egg cartons of the type including a bottom cellular section having a rear hinge on one side and a front hinge on the opposite side thereof, a cover section having depending front and rear side walls, the lower edge of the rear side wall of said cover section being connectively hinged to the rear hinge of said bottom section and the lower edge of the front side wall of said cover section having a cover locking flange connectively hinged thereto and coextensive therewith, and said bottom section having a bottom locking flange connectively hinged to the front hinge thereof and adapted to be positioned within said cover locking flange when said carton is in a closed condition; said apparatus comprising, in combination;

conveying means engaging said carton bottom sections for conveying said cartons along a horizontal travel path toward a carton closing device, said conveying means being adapted to elevate said cartons a predetermined distance above said travel path upon reaching said closing device, said closing device comprising means for imparting initial carton cover closing motion to said cover sections, means for concurrently positioning and maintaining said bottom locking flanges in carton locking condition, means adapted to generally position said cover locking flanges in carton locking condition, said last mentioned means including carton cover engaging means adapted to impart continued closing motion to said cover sections, and biasing means adapted to cammingly engage said cover locking flanges during final closing of said carton cover sections by said carton cover engaging means so as to assure interlocking engagement between said cover locking flanges and said bottom locking flanges whereby said cartons are secured in locked condition.

2. A carton closing apparatus as defined in claim 1 including means interconnecting said initial carton cover closing means and said bottom locking flange positioning means for simultaneous operation thereof.

3. A carton closing apparatus as defined in claim 2 wherein said initial carton cover closing means comprises an elongate rod adapted to contact the surface of said carton cover sections, and said bottom locking flange positioning means comprises an elongate rod adapted to contact said carton bottom locking flanges.

4. A carton closing apparatus as defined in claim 3 wherein said interconnecting means comprises linkage bar means fastened to the end portions of said carton cover closing rod and bottom locking flange positioning rod.

5. A carton closing apparatus as defined in claim 1 wherein said carton cover engaging means comprises an elongate bar member adapted to engage the surface of said carton cover sections, said cover locking flange positioning means comprising a plurality of spaced finger means mounted along the length of said bar member and extending therefrom, the free ends of said finger means being adapted to engage said cover locking flanges so as to bias the latter into generally carton closing condition during the continued closing motion of said cover sections.

6. A carton closing apparatus as defined in claim 1 wherein said cover locking flange biasing means comprises a bar member, a plurality of resilient plate members mounted in spaced relationship along said bar member, said resilient plate members being adapted to contact said cover locking flanges during a portion of the final closing of said carton cover sections so as to cam said flanges internally of said cover sections for locking engagement with said bottom locking flanges.

7. A carton closing apparatus as defined in claim 6 including adjusting means for varying the position of said resilient plate members relative to said carton cover locking flanges.

8. A carton closing apparatus as defined in claim 7 wherein said adjusting means comprises a plurality of support plates mounted on said bar member, each of said resilient plate members being mounted respectively on one of said support plates, and threaded screw means extending through said support plates in threaded engagement therewith, whereby manipulation of said screw means varies the position of said resilient plate members relative to said support plates.

9. A carton closing apparatus as defined in claim 8 wherein said resilient plate members are removably mounted on said support plates.

10. A carton closing apparatus as defined in claim 1 including carton restraining and hold-down means adapted to contact said cartons upon elevation thereof above said travel path, said restraining means comprising means engaging the upper surface portions of said carton bottom sections during initial closing of said carton cover sections.

11. A carton closing apparatus as defined in claim 10 wherein said engaging means comprises depending finger means contacting said bottom sections adjacent the rear hinge portions thereof, and depending means contacting said bottom sections intermediate egg-receiving cells.

12. A carton closing apparatus as defined in claim 9 wherein said restraining and hold-down means is adapted to be retracted to inoperative position during continued and final closing motion of said carton cover sections.

13. A carton closing apparatus as defined in claim 12 including means interconnecting said carton cover engaging means and said carton restraining and hold-down means for simultaneous operation thereof.

14. A carton closing apparatus as defined in claim 13 wherein said interconnecting means comprises a movable linkage means.

15. A carton closing apparatus as defined in claim 1 wherein said conveying means is adapted to lower said cartons to said travel path after closing of said cartons by said closing device, and including further conveying means for receiving said closed cartons from said first mentioned conveying means.

References Cited

UNITED STATES PATENTS

| | | | |
|---|---|---|---|
| 2,842,920 | 7/1958 | Carkhuff et al. | 53—377 X |
| 2,909,880 | 10/1959 | Mumma | 53—377 |

TRAVIS S. McGEHEE, Primary Examiner